United States Patent
Guichard et al.

(10) Patent No.: US 7,256,159 B2
(45) Date of Patent: Aug. 14, 2007

(54) FLUID LOSS REDUCER FOR HIGH TEMPERATURE HIGH PRESSURE WATER BASED-MUD APPLICATION

(75) Inventors: Bertrand Guichard, Villecresnes (FR); Barry Wood, Hornchurch (GB); Patrick Vongphouthone, Sceaux (FR)

(73) Assignee: Eliokem S.A.S., Villejust (FR)

( * ) Notice: Subject to any disclaimer, the term of this patent is extended or adjusted under 35 U.S.C. 154(b) by 0 days.

(21) Appl. No.: 11/508,380

(22) Filed: Aug. 23, 2006

(65) Prior Publication Data

US 2006/0278437 A1  Dec. 14, 2006

Related U.S. Application Data

(62) Division of application No. 10/738,456, filed on Dec. 17, 2003, now Pat. No. 7,101,829.

(30) Foreign Application Priority Data

Dec. 18, 2002 (EP) .................. 02293131

(51) Int. Cl.
- C09K 8/36 (2006.01)
- C09K 8/76 (2006.01)
- C09K 8/588 (2006.01)
- C09K 8/487 (2006.01)
- C09K 8/82 (2006.01)

(52) U.S. Cl. .............. 507/120; 507/118; 507/119; 507/124; 507/129; 507/221; 507/225; 507/239; 507/904; 166/282; 166/283; 516/27; 516/28; 175/72

(58) Field of Classification Search .............. 507/118, 507/120, 119, 124, 129
See application file for complete search history.

(56) References Cited

U.S. PATENT DOCUMENTS

| | | | | |
|---|---|---|---|---|
| 2,512,435 | A | 6/1950 | Mitchell et al. | 516/58 |
| 2,529,460 | A | 11/1950 | Schneiderwirth | 516/75 |
| 2,994,660 | A | 8/1961 | Reddie et al. | 507/131 |
| 3,002,923 | A | 10/1961 | Barker et al. | 507/131 |
| 3,284,393 | A | 11/1966 | Vanderhoff et al. | 524/801 |
| 3,316,965 | A | 5/1967 | Watanabe | 166/280.1 |
| 3,528,914 | A | 9/1970 | Darley | 507/107 |
| 3,624,019 | A | 11/1971 | Anderson et al. | 523/336 |
| 3,711,405 | A | 1/1973 | Pye et al. | 507/203 |
| 3,979,303 | A * | 9/1976 | Kang et al. | 507/110 |
| 4,085,802 | A | 4/1978 | Sifferman et al. | 166/295 |
| 4,168,257 | A | 9/1979 | Meijs | 260/33.6 EP |
| 4,212,312 | A | 7/1980 | Titus | 137/13 |
| 4,233,162 | A * | 11/1980 | Carney | 507/108 |
| 4,468,334 | A * | 8/1984 | Cox et al. | 507/110 |
| 4,740,319 | A * | 4/1988 | Patel et al. | 507/118 |
| 4,816,551 | A * | 3/1989 | Oehler et al. | 528/295.3 |
| H1000 | H * | 12/1991 | Patel et al. | 507/103 |
| 5,086,841 | A | 2/1992 | Reid et al. | 166/295 |
| 5,658,860 | A * | 8/1997 | Clark et al. | 507/134 |
| 6,051,562 | A | 4/2000 | Chamberlain et al. | 514/89 |
| 6,063,737 | A * | 5/2000 | Haberman et al. | 507/261 |
| 6,169,058 | B1 | 1/2001 | Le et al. | 507/222 |
| 6,248,699 | B1 | 6/2001 | Subramanian et al. | 507/265 |
| 6,339,048 | B1 * | 1/2002 | Santhanam et al. | 507/131 |

\* cited by examiner

*Primary Examiner*—Randy Gulakowski
*Assistant Examiner*—John J. Figueroa
(74) *Attorney, Agent, or Firm*—Alvin T. Rockhill

(57) ABSTRACT

The present invention concerns a water-based drilling mud for utilization in the drilling of oil wells comprising an aqueous phase wherein the aqueous phase contains an oil soluble polymer in the form of a gel as a fluid loss reducer. The subject invention further reveals a method of lubricating a drilling bit during the drilling of a well which comprises circulating a water-based drilling mud in the vicinity of the drilling bit wherein the water-based drilling mud is comprised of an aqueous phase, and wherein the aqueous phase contains an oil soluble polymer in the form of a gel as a fluid loss reducer.

17 Claims, No Drawings

FLUID LOSS REDUCER FOR HIGH TEMPERATURE HIGH PRESSURE WATER BASED-MUD APPLICATION

This is a divisional of U.S. patent application Ser. No. 10/738,456, filed on Dec. 17, 2003 now U.S. Pat. No. 7,101,829, in Group Art Unit 1712.

BACKGROUND OF THE INVENTION

Drilling fluids, commonly referred to as drilling muds, are complex mixtures of chemicals. They are required to cool and lubricate the drill bit, suspend formation cuttings, lift them to the surface, and control formation pressure during the drilling of oil wells.

For the most part, the liquid bases are aqueous solutions, oils or emulsions of aqueous and oily materials, to which viscosifiers, dispersants, emulsifiers, weighting agents, fluid loss agents, pH control agents, salts, lubricants, select polymers, corrosion inhibitors, biocides, are usually added to enable the muds to meet the needs of particular drilling operations.

Drilling muds are usually classified as either water-based muds (WBM) or oil-based muds (OBM), depending upon the character of the continuous phase of the mud, although water-based muds may contain oil and oil-based muds may contain water. Oil-based muds generally use hydrocarbon oil as the main liquid component with other materials such as clays or colloidal asphalts added to provide the desired viscosity together with emulsifiers, polymers and other additives including weighting agents. Water may also be present, but in an amount not usually greater than 50 volume percent of the entire composition. If more than about 5% volume water is present, the mud is often referred to as an invert emulsion, i.e., water-in-oil emulsion.

Water based muds conventionally comprise viscosifiers, fluid loss control agents, weighting agents and other additives including lubricants, emulsifiers, corrosion inhibitors, salts and pH control agents. The water makes up the continuous phase of the mud and is usually present in any amount of at least 50 volume percent of the entire composition. Oil is also usually present in minor amounts but will typically not exceed the amount of the water so that the mud will retain its character as a water continuous phase material.

Potassium-muds are the most widely accepted water mud system for drilling water-sensitive shales. $K^+$ ions attach to clay surfaces and lend stability to shale exposed to drilling fluids by the bit. The ions also help hold the cuttings together, minimizing dispersion into finer particles. Potassium chloride (KCl) is the most widely used potassium source. Others are potassium acetate, potassium carbonate, potassium lignite, potassium hydroxide and potassium salt of partial hydrolyzed polyacrylamide (PHPA). For rheology control, different types of polymers are used, for example XC polymer (Xanthan gum) and PHPA. For fluid-loss control, mixtures of starch and polyanionic cellulose are often used. Carboxymethyl starch (CM starch), hydroxy propyl starch (HP starch), carboxymethylcellulose and sodium polyacrylate (SPA) are also used. PHPA is widely used for shale encapsulation.

Salt-water muds contain varying amounts of dissolved sodium chloride (NaCl) as a major component. Undissolved salt may also be present in saturated salt muds to increase density or to act as a bridging agent over permeable zones. Starch and starch derivatives for fluid-loss control and Xanthan gums for hole-cleaning are among the few highly effective additives for salt-water muds.

Sea-water mud is a water based mud designed for offshore drilling whose make-up water is taken from the ocean. Sea-water has relatively low salinity, containing about 3 to 4% by weight of NaCl, but has a high hardness because of $Mg^{+2}$ and $Ca^{+2}$ ions. Hardness is removed from sea water by adding NaOH, which precipitates $Mg^{+2}$ as $Mg(OH)_2$ and by adding $Na_2CO_3$, which removes $Ca^{+2}$ as $CaCO_3$. Mud additives are the same as those used in freshwater muds: bentonite clay, lignosulfonate, lignite, carboxymethylcellulose or polyanionic cellulose and caustic soda. XC polymer may also be used in place of bentonite.

Silicate-mud is a type of shale-inhibitive water mud that contains sodium or potassium silicate as the inhibitive component. High pH is a necessary characteristic of silicate muds to control the amount and type of polysilicates that are formed. Mud pH is controlled by addition of NaOH (or KOH) and the appropriate silicate solution. Silicate anions and colloidal silica gel combine to stabilize the wellbore by sealing microfractures, forming a silica layer on shales and possibly acting as an osmotic membrane, which can produce in-gauge holes through troublesome shale sections that otherwise might require an oil mud.

Lime-mud is a type of water based mud that is saturated with lime, $Ca(OH)_2$, and has excess, undissolved lime solids maintained in reserve. Fluid-loss additives include starch, HP-starch, carboxymethylcellulose (CMC) or polyanionic cellulose (PAC).

Apart from cooling and lubrication of the drilling bit, evacuation of the cuttings to the surface and control of the formation pressure, drillings muds must ensure to minimize invasion into permeable zones.

The drilling fluid creates a filter cake that imparts low permeability to the face of the permeable formation. The ideal filter cake comprises a relatively thin and hard layer as opposed to thick viscous coating. Pressure in the bore hole exceeds the pressure in the permeable formation and thereby creates the filter cake which further results in liquid from the drilling fluid moving into the permeable formation. This leaves a layer of the filter cake on the face of the hole. Liquid permeating this filter cake and the formation is called filtrate. As the thickness of the filter cake increases, the volume of fluid loss also increases. The thinner the filter cake, the lower the fluid loss. A thick wall cake will lead not only to high fluid loss, but also to a reduction in the diameter of the well bore.

The function of the fluid loss control agents is to delay, prevent or at least limit as far as possible fluid losses that may be sustained by the drilling fluids during the drilling operation. However, most of fluid loss control agents used in water based muds such as polyanionic cellulose, carboxymethylcellulose, starch, etc. also give rheology to the mud. This is therefore limiting the level of fluid loss control agent that can be used. In this context, an additive that would only control the fluid loss properties would allow more flexibility in term of level usage. This can become really critical when severe drilling conditions require an ultra-low permeability barrier between the well bore and the formation.

Additionally, the compounds added to the mud must withstand the high temperature/high pressure (HTHP) in the wells. Materials that are described in the art as HTHP fluid loss control aids actually have poor stability under these extreme conditions of temperature and pressure.

For high salinity and high temperature conditions, acrylamido-methyl-propane sulfonate polymers (AMPS polymers) have been developed. However, these polymers are showing limited performance above 120° C.

SUMMARY OF THE INVENTION

The present invention relates to an improved fluid loss reducer for use in water-based drilling mud. It is a principal object of the present invention to provide an improved fluid loss reducer that can be used at high levels and under conditions of high temperature and high pressure in water-based muds.

This invention is based upon the unexpected discovery that an oil soluble polymer in a form of a gel can be used as fluid loss additive for drilling water-based mud compositions. By utilizing such an oil soluble polymer in drilling water-based muds, greatly improved high temperature stability and improved shear resistance can be obtained.

The present invention more specifically discloses a water-based drilling mud comprising an aqueous phase wherein the aqueous phase contains an oil soluble polymer in a form of a gel as fluid loss reducer. The water-based mud drilling fluid according to the instant invention comprises water or salt water, viscosifiers, fluid loss control agents, weighting agents and an oily phase, and other conventional additives selected from the group consisting of emulsifiers, lubricants, corrosion inhibitors, salts and pH control agents.

The present invention more specifically discloses a water-based drilling fluid mud comprising:
(1) from 50 to 90% of the aqueous phase,
(2) from 0.01 to 0.5% of pH controllers,
(3) from 0.1 to 5% of viscosifiers,
(4) from 0.01 to 30% of salts,
(5) from 0.1 to 3% of emulsifiers,
(6) from 4 to 60% of weighting agents,
(7) from 0 to 15% of clays, and
(8) from 0.1 to 20% of oil soluble polymer in form of a gel as fluid loss reducer, said percentages being based on the weight of the mud.

The subject invention further reveals a process for preparing an oil soluble polymer fluid loss control agent comprising the steps of dissolving at least one polymer in a hydrocarbon oil to form a clear solution or a gel, adding an emulsifier to the solution or the gel, and keeping the mixture under conditions of agitation until a clear creamy mixture is obtained.

The present invention also discloses a method of lubricating a drilling bit during the drilling of a well which comprises circulating a water-based drilling mud in the vicinity of the drilling bit, wherein the water-based drilling mud is comprised of an aqueous phase, and wherein the aqueous phase contains an oil soluble polymer in the form of a gel as a fluid loss reducer.

DETAILED DESCRIPTION OF THE INVENTION

The water-based drilling fluid mud of the present invention is comprised of an aqueous phase, wherein the aqueous phase contains an oil soluble polymer in the form of a gel as a fluid loss reducer. The water-based drilling fluid mud will typically be comprised of the aqueous phase, a pH controller, a viscosifier, a salt, an emulsifier, a weighting agent, clay, and an oil soluble polymer in the form of a gel as a fluid loss reducer. This mud composition will normally contain 50% to 90% of the aqueous phase, 0.01% to 0.5% pH controllers, 0.1% to 5% viscosifiers, 0.01% to 30% salts, 0.1% to 3% emulsifiers, 4% to 60% weighting agents, 0% to 15% clays, and 0.1% to 20% of oil soluble polymers in the form of a gel as a fluid loss reducer; based upon the weight of the mud.

The water-based drilling fluid mud will more typically contain 55% to 70% of the aqueous phase, 0.1% to 0.3% pH controllers, 0.4% to 2% viscosifiers, 5% to 15% salts, 0.5% to 2% emulsifiers, 10% to 25% weighting agents, 5% to 10% clays, and 0.5% to 2.5% of oil soluble polymers in the form of a gel as a fluid loss reducer; based upon the weight of the mud.

The oil soluble polymer is highly efficient in small proportions as a fluid loss reducer. It may be incorporated in an amount of 0.1 to 10%, most preferably in an amount of 0.5 to 2.5% based on the weight of the mud.

The suitable polymers for preparing the emulsion used according to the invention are organo-soluble polymers and may be selected from the group constituted by the linear polymers, the grafted polymers, the branched polymers and the cross-linked polymers.

A wide variety of polymers or copolymers can be utilized in this invention. These polymers may be prepared by polymerization using bulk, emulsion, suspension, solution (anionic, cationic, radical, controlled radical), and condensation polymerization technique. Batch, semi-continuous or continuous polymerization processes are suitable for utilization in the synthesis of the polymer.

The monomers that can be employed are typically selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, isoprene, butadiene, ethylene, vinyl acetate, vinyl ester of versatic acids containing from 9 to 19 carbon atoms ($C_9$ to $C_{19}$), and combinations thereof. Functionalized versions of these monomers may also be used. Some representative examples of the selective monomers, which can be used, include styrene, alpha-methylstyrene, para-methylstyrene, para-tertbutylstyrene, vinyltoluene, (M)ethyl(Me)acrylate, 2-ethylhexyl(Me)-acrylate, butyl(Me)acrylate, cyclohexyl(Me)acrylate, isobornyl(Me)acrylate, isobutyl(Me)acrylate,p-terbutyl-cyclohexyl(Me)acrylate, butadiene, isoprene, ethylene, veova, vinyl acetate, acid(Me)acrylic, hydroxy-ethyl(Me)acrylate, glycidyl methacrylate, sodium benzenesulfonate and combinations thereof.

The typical but non-limiting examples of suitable polymers that are useful in this invention are commercially available from a wide variety of sources. For instance, Eliokem sells styrene-acrylate or styrene-butadiene copolymers under the trade name PLIOLITE®, such as PLIOLITE® DF01 polymer, PLIOLITE® DF02 polymer, PLIOLITE® DF03 polymer, PLIOLITE® VTAC-H polymer, PLIOLITE® VT polymer, and PLIOLITE Ultra 200® polymer, substituted styrene-acrylate copolymers under the trade name PLIOWAY®; Rohm sells acrylate resins under the trade name PLEX®, Goodyear Chemicals sells styrene-butadiene rubber under the trade name PLIOFLEX®; Kraton S.A. sells block copolymers styrene-butadiene and their hydrogenated version under the trade name KRATON®.

A wide variety of crosslinking agents can be utilized in carrying out the polymerization to produce these polymers. Some representative examples of crosslinking agents which can be utilized include difunctional acrylates, difunctional methacrylates, trifunctional acrylates, trifunctional methacrylates, allyl maleate and divinylbenzene.

Various other components are added to provide the desired properties for the drilling mud. Various polymers are used to control the mud rheology and therefore to keep the rock cuttings in suspension as they move up to the borehole to the surface. An alkaline substance, such as caustic soda, provides alkalinity to the system. A weighting agent, such as barite, is also used. The water-mud may be a potassium mud, a salt water mud, a sea water mud, or a lime mud.

The present invention further reveals a process for preparing the oil soluble polymer fluid loss control agent. The oil soluble polymer fluid loss control agent may be prepared by dissolving polymers in a hydrocarbon oil to form a clear solution or a gel, adding an emulsifier and keeping the mixture under stirring until a clear creamy mixture is obtained; optionally an emulsion can be prepared by adding water under high shear stirring.

The oil soluble polymer thus obtained is added to a water-based mud prepared by conventional methods, either in replacement of the conventional fluid loss reducers, or in addition to said conventional fluid loss reducers.

The organic liquids which may be utilized in the instant invention are selected with relation to the polymer solubility. The hydrocarbon oil is selected from the group comprising of aromatic hydrocarbon, chlorinated aliphatic hydrocarbons, aliphatic hydrocarbons, cyclic aliphatic ethers, aliphatic ethers, or organic aliphatic esters and mixture thereof. Preferably hydrocarbon oils are selected from the groups of synthetic hydrocarbons and organic aliphatic ester, most preferably from the group of well fluids (base oil) useful in the rotary drilling process. The properties of the base oil can vary however, so that it is usually necessary to perform solubility test to determine the appropriate amount of oil to prepare the emulsion.

The level of emulsifier added to the polymer solution is typically 1 to 30%, preferably from 3 to 20%, most preferably from 5 to 15% based on the weight of the polymer solution/emulsifier mixture. The preferred emulsifiers for use in the instant invention include ionic and non ionic derivatives and mixtures thereof. Specific examples of preferred emulsifiers that are useful in the instant invention include alkyl sulfate, alkyl benzene sulfonate, alkyl ethersulfates, sulfonated oleic acid, alkylphenol ethersulfates, sulfosuccinates, phosphoric ester, fatty acid amides, fatty acid amines, fatty alcohol polyglycolethers, modified fatty alcohol polyglycolethers, alkyl polyglycosides, modified alkyl polyglycosides, alkylphenol polyglycolethers, fatty acid polyglycolethers, sorbitan fatty acid esters. More preferably, the emulsifier is chosen in the group comprising alkyl ethersulfates and fatty acid amides and their derivatives.

Optionally, water can be added to the polymer solution/emulsifier mixture. The level of water is typically 0 to 60%, preferably from 10 to 50%, most preferably from 20 to 40% based on the weight of the polymer emulsion.

The level of polymers in the polymer solution is typically about 1 to about 40%, preferably from 5 to 35%, most preferably from 15 to 25% based on the weight of the polymer solution. It is important for the polymer backbones to be soluble in the organic liquid.

The present invention further reveals the use of an oil soluble polymer in a form of a gel as a fluid loss reducer in a water-based mud. The instant invention further reveals a method of lubricating a drill pipe when drilling well, said method comprising circulating a water-based drilling fluid containing an oil soluble polymer in a form of a gel as a fluid loss reducer.

The oil soluble polymers in a form of a gel, according to the instant invention, allow a good thermal stability and avoid any rheological contribution. They may be used at high temperature and high pressure conditions. Moreover, they improve the quality of the filter cake and also improve the water-based muds lubricity performance.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Preparation of the Oil Emulsion and of the Polymer in a Form of a Gel

The preparation of an oil emulsion is as follows:

First, 100 grams of RADIAGREEN® base oil is mixed with 33.3 grams of DISPONIL FES® emulsifier and kept under stirring for 5 minutes. Then, 36.7 grams of water are slowly incorporated to the oil/emulsifier mixture which is stirred under high shear for 20 minutes. If needed, defoamer is added to the preparation. The particle size of the resulting emulsion is then measured.

The polymers in a form of a gel are prepared using the same recipe: 100 grams of base oil is replaced by 100 grams of 80/20 polymer gel which is prepared by the dissolution of 20 grams of polymers in 80 grams of base oil. The polymers used were either linear, grafted, branched or cross-linked.

EXAMPLE 2

Preparation of the Water-based Muds

The base muds were prepared by utilizing a conventional laboratory method. The muds were then placed in aging cells, pressurized at $6.9 \times 10^5$ Pa (100 psi), and heated for 4 hours at 95° C. (203° F.) and/or 16 hours at 95° C.(203° F.) and/or 16 hours at 130° C. (266° F.). The aging cells were cooled down to room temperature, depressurized and then the rheology of the mud was measured on a Fann Model 35 viscometer at 50° C. (122° F.). Static filtration measurement was performed with standard API filtration cell at $6.9 \times 10^5$ Pa (100 psi) and 25° C.(77° F.).

In order to test the emulsion property at high pressure and high temperature, static filtration measurements at $34.5 \times 10^5$ Pa (500 psi) and 95° C.(203° F.) were performed. The results, obtained with the water-based mud containing the polymeric emulsion, are directly compared with the water-based mud (control) and the water-based mud containing the oil emulsion.

The different mud formulations used are shown in Table I.

TABLE I

| INGREDIENTS | Formulation 1 (water-based mud) (g) | Formulation 2 (g) | Formulation 3 (g) |
| --- | --- | --- | --- |
| Freshwater | 276.5 | 265.2 | 265.2 |
| KCl | 45 | 45 | 45 |
| Caustic Soda | 0.3 | 0.3 | 0.3 |
| Soda Ash | 0.3 | 0.3 | 0.3 |
| Polyanionic Cellulose 1 | 0.75 | 0.75 | — |
| Polyanionic Cellulose 2 | 3.0 | 3.0 | — |
| Xanthan gum | 0.75 | 0.75 | 1.25 |
| OCMA clay | 35 | 35 | 35 |
| Barite | 58.31 | 58.31 | 58.31 |
| Emulsion | — | 31.9 | 31.9 |

Formulation 1 (base-mud) is reference based mud comprising ionic cellulose as fluid loss reducer.

Formulation 2 is a water-based mud with the same composition as formulation 1, but also containing an oil soluble polymer according to the instant invention as fluid loss reducer ("on top" formulation). For the preparation of formulation 2a, the emulsion does not contain any polymer. For the preparation of formulation 2b, a linear polymer is used. For the preparation of formulation 2c, a cross-linked polymer is used.

In formulation 3, polyanionic cellulose is replaced by the oil soluble polymer according to the instant invention. A cross-linked polymer is used.

The results obtained with the non cross-linked and the cross-linked polymers emulsion over the temperature range of 25° C.-95° C.(77° C.-200° F.) are directly compared with the water-based mud (control).

As shown in Table II, the polymeric emulsion gives significantly better results in term of static filtration than the reference formulation without having any impact on mud rheology.

invention, it will be apparent to those skilled in this art that various changes and modifications can be made therein without departing from the scope of the subject invention.

What is claimed is:

1. A method of lubricating a drilling bit during the drilling of a well which comprises circulating a water-based drilling mud in the vicinity of the drilling bit wherein the water-based drilling mud is comprised of
   (1) from 50 to 90% of the aqueous phase,
   (2) from 0.01 to 0.5% of pH control agent,
   (3) from 0.1 to 5% of viscosifiers,
   (4) from 0.01 to 30% of salts,
   (5) from 0.1 to 3% of emulsifiers,
   (6) from 4 to 60% of weighting agents,
   (7) from 0 to 15% of clays, and
   (8) from 0.1 to 20% of an oil soluble polymer in form of a gel as a fluid loss reducer, said percentages being based on the weight of the water-based drilling mud, wherein the oil soluble polymer in the form of a gel is prepared by a process comprising the steps of dissolving at least one polymer in a hydrocarbon oil to form a

TABLE II

| Muds formulations | | 600 rpm | 300 rpm | 200 rpm | 200 rpm | 6 rpm | 3 rpm | Plastic viscosity (cps = $10^{-4}$ Pa.S) | Yield point (lb/100 ft$^2$ = 0.479 Pa) | Room t° C. ml | 95° C. ml |
|---|---|---|---|---|---|---|---|---|---|---|---|
| | | | | (lb/100 ft$^2$ = 0.479 Pa) | | | | | | | |
| Formulation 1 | | 78 | 52 | 43 | 31 | 9 | 7 | 26 | 26 | 4.0 | 13.6 |
| | | 76 | 51 | 43 | 30 | 8 | 6 | 25 | 26 | 4.8 | 14.0 |
| Formulation 2a: Oil emulsion (on top) | | 79 | 54 | 42 | 28 | 7 | 5 | 25 | 29 | 2.0 | 10.0 |
| Formulation 2b: Linear polymer (on top) | VTACH* | 73 | 48 | 37 | 25 | 6 | 4 | 25 | 23 | 1.6 | 8.0 |
| | XPR036*[1] | 73 | 53 | 45 | 33 | 13 | 11 | 20 | 33 | 2.4 | 8.8 |
| | Pliolite VT* | 78 | 56 | 46 | 33 | 8 | 6 | 22 | 34 | — | 8.4 |
| | Kraton G* | 86 | 60 | 49 | 34 | 8 | 6 | 26 | 34 | 2.0 | 8.4 |
| Formulation 2c: Cross-linked polymer (on top) | Pliolite DF01* | 75 | 51 | 40 | 28 | 7 | 5 | 24 | 27 | 1.6 | 6.4 |
| | DF01-NaSS* | 86 | 59 | 48 | 32 | 7 | 6 | 27 | 32 | 1.6 | 6.4 |
| | Pliolite DF02* | 90 | 62 | 50 | 34 | 8 | 6 | 28 | 34 | — | 5.6 |
| | Pliolite DF03* | 89 | 61 | 48 | 33 | 7 | 5 | 28 | 33 | — | 6.0 |
| | CPR 7676* | 88 | 59 | 47 | 32 | 7 | 5 | 29 | 30 | 1.6 | 5.6 |
| | CPR 7755* | 88 | 60 | 49 | 33 | 8 | 6 | 28 | 32 | 1.6 | 6.0 |
| Formulation 3: Cross-linked polymer (replacement) | Pliolite DF01* | 33 | 18 | 14 | 11 | 4 | 3 | 5 | 3 | 4.8 | — |

[1] Are substituted styrene acrylate copolymers.

Filtration value in ml is significantly reduced when polymer such as VTACH® U200 polymer, XPR036 polymer, PLIOLITE® VT polymer, or Kraton® G polymer was added in re-emulsified form in the standard water-based drilling fluid formulation. This value is further reduced when the above polymer is replaced by a cross-linked polymer such as PLIOLITE® DF01, DF02, DF03, CPR7676, and CPR7755 polymers. Replacement in water-based mud of fluid loss reducers by the polymer emulsion leads to equivalent level of filtration versus water-based mud.

As can be seen in Table III, filtration value in ml is significantly reduced after high temperature aging when cross-linked polymer such as PLIOLITE® DF01 was used with an emulsifier package (DISPONIL® FES emulsifier and KLEEMUL® emulsifier) in the standard water-based drilling fluid formulation.

While certain representative embodiments and details have been shown for the purpose of illustrating the subject clear solution or a gel, adding an emulsifier to the solution or the gel, and keeping the mixture under conditions of agitation until a clear creamy mixture is obtained; wherein said oil soluble polymer fluid loss control agent contains up to 50 percent water based on the weight of the control agent; wherein the emulsifier is present at a level which is within the range of 3 percent to 30 percent based upon the weight of the control agent; and wherein the polymer is prepared from monomers selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, isoprene, butadiene, ethylene, vinyl acetate, and vinyl esters of versatic acids containing from 9 to 19 carbon atoms.

2. A method as specified in claim 1 wherein the water-based drilling mud is utilized in conjunction with conventional fluid loss reducers.

3. A method as specified in claim 1 wherein the method is conducted in the absence of conventional fluid loss reducers.

4. A method as specified in claim 1 wherein the water-based drilling mud is further comprised of at least one lubricant.

5. A method as specified in claim 1 wherein the water-based drilling mud is further comprised of at least one corrosion inhibitor.

6. A method as specified in claim 1 wherein the water-based drilling mud is further comprised of at least one fluid loss control agent.

7. A method as specified in claim 1 wherein the water-based drilling mud is comprised of:
   (1) from 55 to 70% of the aqueous phase,
   (2) from 0.1 to 0.3% of pH controllers,
   (3) from 0.4 to 2% of viscosifiers,
   (4) from 0.5 to 15% of salts,
   (5) from 0.5 to 2% of emulsifiers,
   (6) from 10 to 25% of weighting agents,
   (7) from 5 to 10% of clays, and
   (8) from 0.5 to 2.5% of oil soluble polymer in form of a gel as fluid loss reducer, said percentages being based on the weight of the mud.

8. A method as specified in claim 1 wherein the oil soluble polymer is incorporated into the water-based drilling mud in an amount which is within the range of 0.1% to 10%, based on the weight of the mud.

9. A method as specified in claim 1 wherein the oil soluble polymer is prepared from monomers selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, isoprene, butadiene, ethylene, vinyl acetate, and vinyl esters of versatic acids containing from 9 to 19 carbon atoms.

10. A method as specified in claim 1 wherein the hydrocarbon oil is selected from the group consisting of aromatic hydrocarbons, chlorinated aliphatic hydrocarbons, aliphatic hydrocarbons, cyclic aliphatic ethers, aliphatic ethers and organic aliphatic esters.

11. A method as specified in claim 1 wherein the emulsifier is a member selected from the group consisting of alkyl sulfates, alkyl benzene sulfonates, alkyl ethersulfates, sulfonated oleic acid, alkylphenol ethersulfates, sulfosuccinates, phosphoric ester, fatty acid amides, fatty acid amines, fatty alcohol polyglycolethers, modified fatty alcohol polyglycolethers, alkyl polyglycosides, modified alkyl polyglycosides, alkylphenol polyglycolethers, fatty acid polyglycolethers, and sorbitan fatty acid esters.

12. A method as specified in claim 1 wherein the emulsifier is selected from the group consisting of alkyl ether sulfates and fatty acid amides.

13. A method as specified in claim 1 wherein the weighting agent is barite.

14. A method as specified in claim 6 wherein the fluid loss control agent is selected from the group consisting of carboxymethylcellulose, polyanionic cellulose, and starch.

15. A method as specified in claim 1 wherein the clay is present at a level which is within the range of 5 weight percent to 10 weight percent, based on the weight of the water-based drilling mud.

16. A method as specified in claim 7 wherein the fluid loss control agent is starch.

17. A method as specified in claim 7 wherein the fluid loss control agent is carboxymethylcellulose.

* * * * *